United States Patent Office 3,634,374
Patented Jan. 11, 1972

3,634,374
POLYMERIZATION OF CHLORINE CONTAINING UNSATURATED POLYMERS AND PRODUCTS THEREOF
Anthony J. Bell, Stow, Ohio, assignor to The Goodyear Tire & Rubber Company, Akron, Ohio
No Drawing. Continuation-in-part of application Ser. No. 855,750, Sept. 5, 1969. This application Oct. 1, 1969, Ser. No. 862,954
Int. Cl. C08f 15/06, 5/00
U.S. Cl. 260—87.5
2 Claims

ABSTRACT OF THE DISCLOSURE

There is disclosed a process for the homopolymerization of an unsaturated multicyclic compound containing a 3,5-disubstituted hexachlorocyclopentene moiety. The copolymerization of such compounds with cyclic olefins is also disclosed. The polymerizations proceed via the cleavage of the double bond contained in the cyclic rings. Polymers resulting from these polymerizations are also disclosed as compositions.

---

This application is a continuation-in-part of an application of Anthony J. Bell, entitled "Polymerization of Chlorine Containing Unsaturated Polymers and Products Thereof," Ser. No. 855,750, filed Sept. 5, 1969.

This invention relates to polymerization processes of unsaturated alicyclic compounds and to the products resulting therefrom.

In its broad aspect, the invention is directed to the preparation of polymers by the ring-opening polymerization of multicyclic unsaturated monomers which are characterized by the possession of at least one cyclic constituent having a structure equivalent to 3,5-disubstituted hexachlorocyclopentene depicted as (I):

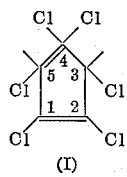

(I)

and said cyclic constituent of Formula I is attached to the remaining part of the unsaturated multicyclic molecule as depicted as (II):

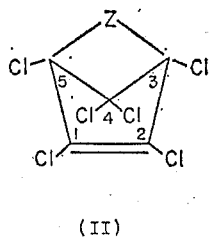

(II)

whereby Z represents:

(a) a vinylene double bond of the formula —CH=CH—; or
(b) a hydrocarbon fragment containing
  (1) Four or more carbon atoms situated in a linear succession between carbons 3 and 5 of (II);
  (2) At least one —CH=CH— grouping, said
    —CH=CH—
  grouping being a constituent of at least one 4 or 5 or 7 or larger membered ring;
  (3) Any remaining carbon in the linear succession, other than the carbons of said —CH=CH— groupings may be substituted by at least one member of the group consisting of alkyl, aryl, alkenyl, aralkyl, alkaryl, cycloalkyl, cycloalkenyl, bicycloalkyl, bicycloalkenyl and chlorine radicals;

(4) Any of the said carbon atoms in the linear succession of Z may be constituents of alicyclic rings; and
(5) (II) contains no non-aromatic conjugated double bonds.

The ring opening polymerization of monomers having the general Formula II can be promoted by a variety of catalytic systems. Examples of catalysts which are effective in causing such polymerizations are described elsewhere in this specification. The subject polymers of this invention, which are obtained by a ring-opening polymerization of monomers corresponding to the formula depicted as (II) above retain the hexachloro-3,5-disubstituted cyclopentene moiety depicted as (I), either as part of a pendant side group or part of the polymeric main chain.

When the Z portion of the compound depicted as Formula II above is a linear unsaturated sequence described elsewhere in this specification (Table I, A, 1 and 2), the polymerization of the respective monomers will provide polymers of the formula depicted by (III):

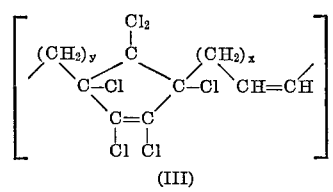

(III)

wherein y and x may be 0 or any whole number, but when y and/or x are whole numbers x plus y must equal at least 2.

When Z of the compound depicted as (II) above is alicyclic or bicyclic described elsewhere (Table 1, C and D), the product of the ring-opening polymerization will have the chlorinated cyclopentene moiety depicted above as (I) as a part of the pendant side group. To exemplify the case of Z in Formula II as being bicyclic the polymerization of a monomer such as that set forth at Table 1, D.6. which is sold under the registered trademark Aldrin is illustrated herein:

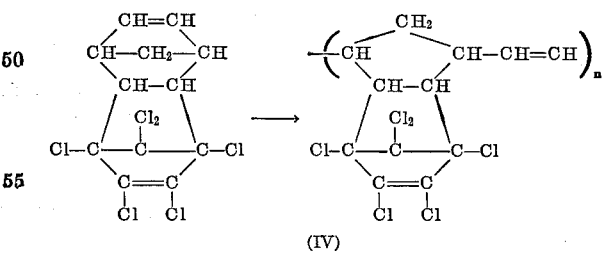

(IV)

wherein n equals the degree of polymerization.

Thus, in the polymerization reaction within the scope of the present invention, the conversion of monomer to polymer occurs via cleavage of an unsaturated cyclic structure other than the hexachloro-3,5-disubstituted cyclopentene ring of Formula I above. Hence, it is possible to classify the group of polymers obtained by the present invention as polymers that: (1) possess within their repeat unit the 3,5-disubstituted hexachlorocyclopentene moiety (I), either as a constituent of the main chain or as part of a pendant side group; and (2) possess within their repeat unit at least one vinylene double bond, —CH=CH—, situated along the main polymer chain.

The structures of these chlorinated polymers are such that the only chlorine atoms adjacent to hydrogen atoms are situated on bridgehead carbons. Hence, these polymers are not prone to dehydrochlorination or decomposition involving the loss of HCl gas, as are conventional chlorine containing polymers, at elevated temperatures.

The physical properties of the polymers obtained from monomers of the structure depicted by (II) will depend on the structure of Z as well as on the ultimate cis or trans configuration of the vinylene double bonds. By selection of catalysts and/or polymerization conditions, it is conceivable that polymers with varying levels of cis and trans vinylene unsaturations can be prepared.

Another aspect according to the present invention is the ring-opening copolymerization of at least one multicyclic unsaturated monomer represented by the general Formula II above with at least one alicyclic unsaturated monomer selected from the group consisting of:

(A) Alicyclic compounds corresponding to the Formula V:

(V)

wherein:

(1) Q is a fragment which comprises a sequence of at least five carbon atoms situated in a linear succession between the methylidene carbons which constitute the double bond;

(2) The carbon atoms in the linear succession of Q may be interconnected by both carbon-carbon single bonds and carbon-carbon double bonds;

(3) Any of the carbon atoms in the linear succession of Q may be substituted by at least one member from the group of alkyl, aryl, alkenyl, aralkyl, alkaryl, cycloalkyl, cycloalkenyl, bicycloalkyl, bicycloalkenyl and chlorine radicals;

(4) Any of said carbon atoms in the linear succession of Q may be constituents of aromatic and alicyclic rings; and (5) Said alicyclic unsaturated hydrocarbon contains no non-aromatic conjugated double bonds; and (B) Alicyclic compounds corresponding to the Formula VI:

(VI)

wherein:

(1) P is a fragment which comprises a sequence of at least two and not more than three carbon atoms situated in a linear succession between the methylidene carbons which constitute the double bond;

(2) The carbon atoms in the linear succession of P are connected by carbon-carbon single bonds;

(3) Any of the carbons in the linear succession of P may be substituted by at least one substituent member from the group of alkyl, aryl, alkenyl, aralkyl, alkaryl, cycloalkyl, cycloalkenyl, bicycloalkyl bicycloalkenyl and chlorine radicals;

(4) Any of said carbons in the linear succession of P may be constituents of aromatic or alicyclic rings; and (5) Said alicyclic unsaturated hydrocarbon compound contains no non-aromatic conjugated double bonds.

These copolymers may vary in their physical properties depending on the particular compositions of the Z, Q and P moities, the relative ratio of monomers that are charged and the ratio of monomers in the polymerized product, the nature of the polymerization catalyst, and the polymerization conditions. Materials that range from plastics with high softening temperatures to elastomers with low glass transformation temperatures can be thus prepared.

The selected skeletal formulas set forth in Table 1 will illustrate the nature of certain Z groups and the resulting monomers. These are presented for illustrative purposes only and are not intended to limit the scope of the present invention. It is believed that this will further explain this invention. In the following formulas, S is intended to represent any substituent member of the group: alkyl, aryl, alkenyl, aralkyl, alkaryl, cycloalkyl, bicycloalkyl, cycloalkenyl, bicycloalkenyl and chlorine radicals. The structural formulas of the polymers obtained from the respective monomers listed are not included as these are easily reconstructed by a skilled person as previously exemplified in Formulas III and IV.

TABLE 1

A. Linear Unsubstituted

| Z group | Polymerizable monomer (II) |
|---|---|
| 1. —CH=CH— | ![structure] |
| 2. —(CH$_2$)$_x$—CH=CH—(CH$_2$)$_y$—<br>x and y greater than 0;<br>z + y equal or greater than 4. | ![structure] |

B. Linear Substituted

| | |
|---|---|
| 3. (CH$_2$)$_x$—CH=CH—CH—(CH$_2$)$_y$<br>                                              |<br>                                                 S<br>x and y greater than 0;<br>z + y equal or greater to 3;<br>S equals a substituent. | ![structure] |

TABLE 1—Continued

| Z group | Polymerizable monomer (II) |
|---|---|
| C. Alicyclic | |
| 4 | |
| 5 | |
| D. Bicyclic or Tricyclic | |
| 6 | |
| 7 | |

Representative alicyclic monomers of structures corresponding to the general Formulas V and VI previously defined, which can be copolymerized with monomers corresponding to the general Formula II previously defined, are cyclobutene, cyclopentene, cycloheptene cyclooctene, 3-alkyl-, 4-alkyl- and 5-alkyl-cyclooctene; 3-aryl-, 4-aryl- and 5-arylcyclooctene; 1,4- and 1,5-cyclooctadiene; 1-alkyl-1,5-cyclooctadiene; 1,2-dialkyl-1,5-cyclooctadiene; 1-chloro-1,5-cyclooctadiene; cyclononene; 1,4- and 1,5-cyclononadiene; 1,4,7-cyclononatriene; cyclodecene; 1,4-, 1,5- and 1,6-cyclodecadiene and 1,4,7-cyclodecatriene, cycloundecene, 1,4-, 1,5- and 1,6-cycloundecadiene; 1,4,7- and 1,4,8-cycloundecatriene; cyclododecene; 1,4-, 1,5-, and 1,7-cyclododecadiene; 1,4,7-, 1,4,8-, 1,5,9-cyclododecatriene. Also, monomers such as norbornene, norbornadiene, and dicyclopentadiene can be copolymerized with type II monomers.

The homopolymerizations of monomers having structural formulas corresponding to Formula II and their copolymerizations with monomers of the types of Formulas V and/or VI which are the subject of the present invention proceed by a ring-opening process of an alicyclic unsaturated structure possessing a vinylene —CH=CH—, type of double bond as a constituent of the said alicyclic structure. The salient features of this polymerization reaction are disclosed in various references (i.e. Journal of Polymer Science, A–1, 5, 2209 (1967)).

The control of the molecular weights of homopolymers and copolymers, subjects of present invention, can be conveniently carried out by incorporation of minute amounts of acyclic olefins in the respective polymerization recipes. The process by which molecular scission can occur is the metathesis of a —CH=CH— vinylene main chain double bond and the vinylene —CH=CH— double bond of the added acyclic olefin is:

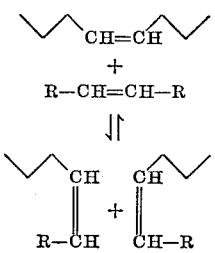

A variety of catalyst systems are effective in promoting ring-opening polymerization of unsaturated alicyclic monomers, and hence, can be considered as possible catalysts for the polymerization processes subject of this invention.

One class of catalysts employed in the polymerizations of this invention is a combination comprising: (A) at least one organometallic compound wherein the metal is selected from the group consisting of Ia, IIa, IIb and IIIa groups of the Periodical Table of Elements, (B) at least one metal derivative wherein the metal is selected from the group consisting of molybdenum and tungsten and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl (8) when Y is O, R is alkoxy, arylalkoxy and alkaryloxy and radicals of (2) through (6) wherein at least one hydrogen is substituted by a group selected from hydroxyl (OH) and thiol (SH) The Periodic Table of Elements referred to may be found in the Handbook of Chemistry and Physics, 44th edition, April 1962 reprint, published by the Chemical Rubber Publication Company, Cleveland, Ohio, U.S.A., p. 448.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organometallic compounds are compounds of lithium, sodium, magnesium, aluminum, zinc and cadmium with aluminum being most preferred.

Representative examples of organometallic compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum, and the like; triarylaluminums such as tritolylaluminum, tribenzylaluminum, triphenylaluminum, and the like; dialkylaluminum halides such as diethylaluminum chloride, di-n-propylaluminum chloride, diisobutylaluminum chloride, diethylaluminum bromide, diethylaluminum iodide and diethylaluminum fluoride, and the like; mixtures of dialkylaluminum halides and alkylaluminum dihalides such as ethylaluminum sequichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride, and the like; arylaluminum hydrides and dihydrides such as diphenylaluminum hydride and phenylaluminum dihydride, the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide, and the like. Other organometallic compounds are also useful in the practice of this invention. Representative of such organometallic compounds are organoalkali metal compounds such as alkyllithium compounds as ethyllithium, n-butyllithium, t-butyllithium and the like; lithium-aluminum-tetraalkyls such as lithium-aluminum-tetrabutyl, lithium-aluminum-tetraethyl, and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide, and the like; calcium, strontium and barium organo compounds such as barium alkyls and aryls of Groups IIb metals such as diethylzinc, diphenylzinc, ethylzinc chloride, diethylcadmium, dibutylcadmium, and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminumsesquihalides.

The metal derivatives employed in the catalyst of this invention as the second or (B) catalyst component are selected from the derivatives of molybdenum and tungsten. Representatives of such derivatives include halides such as chlorides, bromides, iodides and fluorides, which include compounds such as molybdenum pentachloride, tungsten, hexachloride, molybdenum pentabromide, tungsten hexabromide, molybdenum pentaiodide, molybdenum pentafluoride, molybdenum hexafluoride and tungsten hexafluoride. Other representative salts are those of acetylacetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides, representative of which are tungsten hexachloride and molybdenum pentachloride.

The third or (C) component of the catalyst system of this invention are compounds which respond to the formula R—Y—H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and (9) radicals of (2) through (6) wherein at least one hydrogen of R is substituted by at least one hydroxyl (OH) or thiol (SH) group.

Thus, the formula above defines a number of types of compounds. It defines water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials responding to the formula above are alcohols representative of which are methanol, ethanol, isopropanol, tertiarybutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl and similar mercaptans, allyl mercaptan, thiophenol, 4-methylthiophenol, 4-mercaptophenol; the hydroperoxides such as cumyl hydroperoxide, tertiarybutyl hydroperoxide; the hydrodisulfides such as cumyl hydrodisulfide, 5-butyl hydrodisulfide; the polyalcohols such as ethylene glycol, glycerol, and similar polyglycols; catechol, resorcinol, hydroquinone, pyrogallol; the polymercaptans such as 1,3-propane dithiol, 1,4-dithiobenzene; the hydroxymercaptans or thioalcohols such as ethane-2-ol-1-thiol, 1-hydroxy-4-thiobenzene.

One of the unusual and distinguishing features of the catalyst system of this invention is that the compound of the formula R—Y—H, wherein R and Y have been previously defined, depending on the particular monomers employed, the particular organometallic compound and the particular Group VIb metal salt chosen and on the particular R—Y—H compound chosen, when employed in fairly substantial amounts are known to reduce drastically the activity of the polymerization reaction of this invention. An unexpected high activity of the catalyst of the present invention was found when compounds of the R—Y—H type were employed in relatively small amounts and added according to the teachings set forth in the present specification and examples. Since the instant invention contemplates the use of organometallic combination with transition metal salts and various oxygen and sulfur-containing compounds, and since various factors or considerations will influence the optimum range of the three catalyst components in relation to each other, the molar ratios of the three components which optimize the reaction conditions cannot be readily set forth. However, by following the teachings found in this application, those skilled in the art can readily determine the optimum molar ratio of the three catalyst components to each other. Obviously, if one employs the oxygen or sulfur-containing compound or as is designated above, component C in relatively large amounts, the activity of the catalyst will be reduced considerably or even destroyed.

It has been found that good results are obtained in the practice of this invention when the molar relationship between the three catalyst components, A, B and C as previously defined, are within a molar ratio of $B/C$ ranging from about 0.2/1 to at least about 20/1 and the molar ratio of $A/B$ is within the range of about 0.5/1 to at least 15/1. More preferred ratios are $B/C$ of 0.5/1 to 5/1 and $A/B$ of 0.5/1 to 8/1. Still more preferred ratios were $B/C$ of 1/1 to 2/1 and $A/B$ of 0.75/1 to 5/1.

The catalysts employed in this invention are prepared by mixing the components by known techniques. Thus, the catalysts may be prepared by "preformed" or "in situ" techniques. By the "preformed" method the catalyst components are mixed together prior to exposure of any of the catalyst components to the cyclic monomers to be used in the polymerization reaction. In the "in situ" method the catalyst components are added separately to the cyclic monomers to be used in the polymerization reation. The catalyst components may be mixed either as pure compounds or as suspensions or solutions in liquids which do not adversely affect catalyst activity or the polymerization reaction. Representative of such liquids are saturated hydrocarbons such as hexane, pentane and the like, or aromatics such as benzene, toluene and the like.

While the presence of the alicyclic monomers is not essential during the formation of active catalyst by a mixing of components A, B and C and this fact facilitates the use of "preformed" catalysts, it has been found that freshly preformed catalysts are generally more active than catalysts which have been allowed to age before use.

The order of addition of the three catalyst components to each other is of interest in the practice of this invention. There are various methods in which the three catalyst components can be brought into contact with the monomers or monomers/solvent mixture. The following is a numerical listing of these various methods in which A, B and C stand for the catalyst components as previously defined:

(1) Simultaneous addition of A, B and C;
(2) C followed by A and B which were previously preformed;
(3) A and B preformed followed by C;
(4) A followed by B and C which were preformed;
(5) B and C preformed followed by A;
(6) B followed by A and C which were preformed;
(7) A and C preformed followed by B;
(8) A followed by B followed by C;
(9) B followed by A followed by C;
(10) C followed by B followed by A;
(11) C followed by A followed by B;
(12) B followed by C followed by A;
(13) A followed by C followed by B;
(14) Preformed A, B and C which was prepared by adding A to B and C preformed;
(15) Preformed A, B and C which was prepared by adding B to A and C preformed; and
(16) Preformed A, B and C which was prepared by adding C to A and B preformed.

Thus, it can be seen that the catalyst components in this particular catalyst system employed in the polymerization process of this invention can be prepared by a variety of techniques. Those skilled in the art will be able to determine the optimum methods of preparation which suit their particular needs following the teachings set forth in this application.

The amount of catalyst employed in the polymerization reaction of this invention may be varied over wide concentrations and has not been found to be critical. Of course, a catalytic amount of the catalyst must be employed. The optimum amount of catalyst depends upon a number of factors such as temperature, particular monomers used, purity of monomers, reaction times desired and the like. Those skilled in the art will readily determine the optimum catalytic ranges. The polymerization can be conducted wherein the amount of catalyst employed is about 0.01 part by weight of B per 100 parts by weight of cyclic monomer employed, with components A and C adjusted to yield a desirable atomic ratio of $A/B/C$.

A second class of catalysts effective in the polymerizations of the present invention consists of a two-component catalyst system. This catalyst system comprises (A) at least one organoaluminum halide selected from the group consisting of $RAlX_2$ and $R_2AlX$ wherein X is a halide such as chloride, bromide, iodide, and fluoride, and R is selected from the group of alkyl, aryl, arylalkyl and alkaryl, and (B) at least one tungsten derivative.

Thus, representative examples of the first or (A) catalyst component are aluminum compounds having at least one aluminum-to-carbon bond. Representative of such compounds are dialkylaluminum halides such as diethylaluminum chloride, di-n-propylaluminum chloride, diisobutylaluminum chloride, diethylaluminum bromide, diethylaluminum iodide and diethylaluminum fluoride, and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide, and the like; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like.

Representative of the tungsten salts employed as the second or (B) catalyst component include halides such as chlorides, bromides, iodides and fluorides, which include compounds such as tungsten hexachloride, tungsten hexabromide, tungsten hexaiodide, and tungsten hexafluoride. Other representative salts are those of acetylacetonates, sulphates, phosphates, nitrates, and the like which include compounds such as tungsten phosphate, tungsten nitrate, tungsten acetylacetonate and tungsten sulphate. Mixtures of these salts may also be employed. Of these, it is usually preferred to employ tungsten halides such as tungsten hexachloride and molybdenum pentachloride.

The molar relationship between the two catalyst components A and B as previously defined in this catalyst system are within a molar ratio of $A/B$ of about 0.5/1 to about 15/1 with a more preferred molar ratio of $A/B$ of about 0.5/1 to about 8/1 and a still more preferred molar ratio of $A/B$ of about 0.75/1 to about 5/1. These catalysts can be prepared by in situ or preformed techniques. No particular order of addition is required in preparing active catalysts from this species. These catalyst components may be reacted together as pure componds or in solutions or suspensions in inert liquids. Representative of such liquids are saturated hydrocarbons such as pentane, hexane and the like or aromatic hydrocarbons such as benzene, toluene and the like.

The amount of catalyst employed in the polymerization reactions, when this two-component catalyst system is employed, has not been found to be critical and may range over wide concentrations. Of course, a catalytic amount of the catalyst must be employed but the optimum amount depends upon a number of factors such as temperature employed, the particular reactants employed, the purity of the reactants, the reaction times desired, and the like. Polymerization reactions can be conducted wherein the amount of catalyst is about 0.001 parts by weight of the (B) component per 100 parts by weight of the monomer employed with the proper mol ratio of $A/B$ being adjusted.

A third class of catalysts effective in the polymerization of the present invention consists of (A) an aluminum halide, $AlX_3$, and (B) as a salt of the transition metal tungsten, whereby the tungsten is at any oxidation status within the IV to VI range.

Representative examples of component (A) are: aluminum chloride, aluminum bromide, aluminum iodide and aluminum fluoride. The preferred halides are the chloride and bromide of aluminum. Examples of component (B) are: tungsten, tetra-, penta- and hexachloride, tungsten tetra- and pentabromide, tungsten tetra- and pentaiodide, tungsten hexafluoride and the tungsten oxychlorides. This two component catalyst system is unique as it does not require the employment of any organometallic catalyst component. However, this system can be further modified by an organometallic reagent. (In certain ring-opening polymerizations of unsaturated alicyclic compounds, advantages such as suppression of gel formation, and an increase in polymerization rates at lower catalyst levels can be achieved by the modification of the last two-component catalyst system by a third organometallic reagent). Examples of such organometallic reagents are organoalkali metal compounds such as alkyl and aryllithium; alkyl- and arylsodium; organomagnesium compounds such as dialkyl- or diarylmagnesium; organomagnesium halides; organometallic derivatives of calcium, strontium and barium; alkyls and aryls of Group IIb metals such as dialkyl- and diarylzinc and the like.

Other classes of catalysts which are effective in promoting the polymerizations of this invention are those disclosed in United States patent applications Ser. Nos. 755,374; 755,375; 755,376 and 795,693.

The polymerizations of this invention may be conducted in solution or in bulk. When the polymerization is carried out in solution, solvents which do not adversely affect the polymerization are desired. Representative of useful solvents are liquid aromatic hydrocarbons such as benzene, chlorobenzene and toluene; hydrogenated aromatic hydrocarbons such as tetralin; liquid aliphatic hydrocarbons such as pentane, heptane, hexane, petroleum ether, decane; and alicyclic hydrocarbons such as cyclohexane, Decalin and cyclooctane. Mixtures of such solvents may also be used.

Temperatures at which the polymerization reaction is carried out can be varied over a wide range. Usually the temperature can be varied from extremely low temperatures, such as −60° C., up to high temperatures, such as 150° C. or higher. Thus, the temperature is not a critical factor of the invention. It is generally preferred, however, to conduct the reaction at a temperature in the range of from about −20° C. to about 80° C. The pressure at which the polymerization is carried out can also be varied over a wide range. The reaction can be conducted at atmospheric pressure or, if desired, it can be carried out at sub-atmospheric pressure or super-atmospheric pressure. Generally, a satisfactory polymerization is obtained when the reaction is carried out at about autogenous pressure developed by the reactants under the operating conditions used.

The polymerization time will vary and can range from few seconds to 24 hours or more, depending upon the polymerization conditions, the amount of catalyst employed, and the degree and extent of polymerization desired.

The polymerization reaction may be carried out as a batch or as a continuous process. In performing the polymerizations of this invention, the introduction of the monomer, catalyst and solvent, when a solvent is employed, can each be made to the reaction zone alternately, intermittently and/or continuously.

It is thought that the polymerizations of this invention take place through a ring-opening polymerization mechanism. Such ring-opening polymerization of unsaturated alicyclic compounds can be used to make a number of useful copolymers and terpolymers that have not been capable of being made before.

The low volume decrease accompanying a ring-opening polymerization is another major advantage over conventional addition polymerization, particularly where these monomers are bulk polymerized to form potting compounds and various articles, examples of which are molded plastic materials, molded rubber-like goods, shoe soles and heels, industrial belts and vehicle tires.

In these applications the monomer may be polymerized in the presence of one or more reinforcing carbon blacks, pigments or resins and certain antioxidants. The products made by this procedure may be crosslinked by adding polymerizable polyfunctional compounds, for example, bicyclopentadiene, to the main monomer. The molded products made by ring-opening polymerization may be crosslinked by exposure to ionizing radiation such as gamma rays, X-rays or electrons. These molded products may also be crosslinked or vulcanized by incorporating certain compounds which on heating during or subsequent to the polymerization will lead to conventional crosslinking or vulcanization of these polymers.

The polymers and copolymers of the practice of this invention can be crosslinked by any conventional or unconventional crosslinking methods such as the conventional accelerated sulfur vulcanization and peroxide vulcanization or ionization radiation vulcanization process. Thus, these polymers and copolymers can be employed in a variety of uses where severe oxygen, ozone and chemical degradation is encountered. They are particularly valuable when elastomeric in nature in the manufacture of elastomeric molded products such as belts, hose, gaskets, and other elastomeric products which require oxygen and ozone resistance and for other rubber-like products which require resistance to oils and other degrading chemicals.

These polymers and copolymers can be prepared in a manner so that they are plastic in nature as well as elastomeric. When in this form these polymers and copolymers can be molded, extruded and spun into films, fibers, and other plastic-like products.

The following examples are set forth to further illustrate the nature of this invention. However, it should be understood that the examples are set forth for illustrative and not limitative purposes.

EXAMPLE 1

Aldrin, as described previously, (17.5 gms.) was dissolved in 65 ml. of chlorobenzene in a dry 4-ounce bottle, and the solution was sparged with nitrogen before capping with a self-sealing cap. A catalyst solution of 0.05 molar concentration, prepared by co-reacting equimolar quantities of tungsten hexachloride (WCl$_6$) and ethanol (C$_2$H$_5$OH) in benzene, in the amount of 4.0 ml. was syringed into the polymerizing mixture followed by 2.5 ml. of C$_2$H$_5$AlCl$_2$ (EADC) solution of 0.2 molar concentration; thus, maintaining a ratio of Al/w/O catalyst components equivalent to 2.5/1.0/1.0, respectively. An increase in viscosity was observed within seconds. The polymerization was allowed to proceed for 10 minutes at room temperature, then terminated with excess methanol. The product was isolated and purified by dissolving in CHCl$_3$ and recoagulating in methanol. Upon drying, 16.7 gms. of solid polymer was obtained, indicating a 95 percent conversion of Aldrin to polymer. A Nuclear Magnetic Resonance (NMR) analysis of the polymer confirmed that of all the protons present in the polymer, 24 percent are of the vinylene type (—CH=CH—)

(theoretical 25 percent), thus, supporting the structure

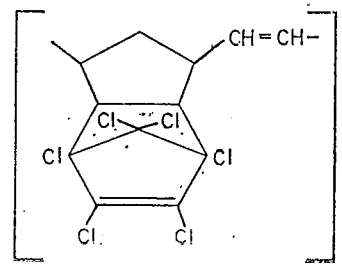

for the polymer's repeat unit. Furthermore, infrared analysis of the polymer showed substantial amount of trans- vinylene type of unsaturation:

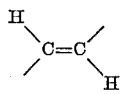

This further indicates that the polymerization proceeds by cleavage of the alicyclic ring with the vinylene double bond. The polymer was a plastic with a softening point above 300° C.

EXAMPLE 2

By a polymerization procedure similar to Example 1, the monomer:

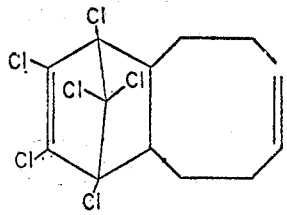

was homopolymerized with a similar catalyst as that described in Example 1 except that the Al/W/O molar ratio was 4.0/1.0/1.0 respectively. The polymerization was allowed to proceed for one hour at room temperature leading to a 52 percent conversion to a solid, plastic polymer having a repeat unit structure equivalent to:

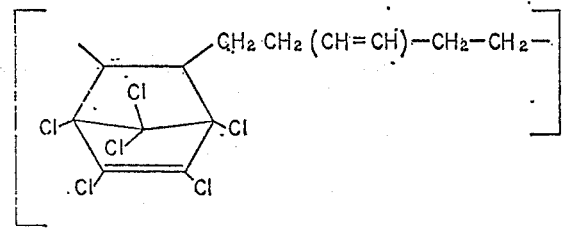

EXAMPLE 3

A mixture of 38 grams of aldrin and 99 grams of cyclooctene which is a mole ratio of 1/9, containing 2 grams di-t-butyl-p-cresol antioxidant and 25 microliters of 2-pentene introduced as a molecular weight modifier, was polymerized in bulk (no added solvent) by a catalyst comprising 4.0 ml. of a 0.05 molar mixture of $WCl_6$ and $C_2H_5OH$ and 4.0 ml. of a 0.2 molar $C_2H_5AlCl_2$, added respectively to give an Al/W/O mole ratio of 4/1/1. The mixture was allowed to react for one hour at room temperature before terminated by soaking the solid rubbery product in a large volume of methanol. After isolation and drying, a total conversion to cyclooctene/aldrin copolymer of 98 grams was obtained. The polymer had a chlorine content of 18.8 percent by weight, an inherent viscosity of 2.14 dl./g., and a glass transition temperature (Tg) of −91° C.

EXAMPLE 4

The rubbery product obtained in Example 3 was compounded according to a sulfur-accelerated recipe and compared to neoprene which was compounded according to a metal oxide curing recipe. The relevant data are presented in the following table:

RECIPES

| Copolymer (Example 3) | | Neoprene | |
|---|---|---|---|
| Copolymer | 100.0 | Neoprene GN | 100.0 |
| HAF Black | 30.0 | HAF Black | 30.0 |
| Diphenyl-p-phenylene diamine | 1.0 | Phenyl-α-naphthyl amine | 2.0 |
| Stearic acid | 3.0 | MgO | 4.0 |
| Sulfur | 1.4 | Stearic acid | 0.5 |
| Diphenyl guanidine | 0.9 | ZnO | 5.0 |
| 2,2′-dithio-bis-benzothiazole | 0.5 | | |

STRESS-STRAIN

| | | | |
|---|---|---|---|
| Modulus (300%) p.s.i | 1,500 | | 2,200 |
| Tensile p.s.i | 4,400 | | 4,100 |
| Elongation percent | 540 | | 500 |

GLASS TRANSITION

| | | | |
|---|---|---|---|
| Temperature, ° C | −90 | | −44 |

OIL RESISTANCE

| | | | |
|---|---|---|---|
| Swelling in ASTM #3 oil 70 hrs. at 212, percent | 114 | | 98 |

EXAMPLE 5

By a similar polymerization procedure as described in Example 3, a copolymerization of aldrin and cyclooctene at a 1:4 initial monomer molar charge ratio was carried out. (In this experiment 2-pentene acting as a molecular weight modifier was not added.) The polymerization proceeded at room temperature for 18 hours leading to a final conversion of 53 percent of solid rubber having an inherent viscosity of 2.46 dl./g. and a glass transition temperature of −66° C. The copolymer had a chlorine content of 30 percent by weight. (Theoretical is 26.5 percent, assuming equal reactivity of both monomers to the copolymerization reaction).

EXAMPLE 6

By a similar polymerization procedure as described in Example 3, a copolymerization of aldrin and cyclooctene at a 3:1 molar ratio was carried out using acid-washed, dry benzene as a solvent (50/50 monomers/solvent by weight). The copolymerization was effected by the $WCl_6$/$C_2H_5OH$/$C_2H_5AlCl_2$ catalyst combination using a molar ratio of 2.5/1.0/1.0 of Al/W/O, respectively. The reaction proceeded for two hours at room temperature before being terminated. A 98 percent conversion to a solid flexible plastic was obtained.

EXAMPLE 7

A mixture of aldrin (3.7 grams) and 1,5-cyclooctadiene (2.2 grams) (1:2 molar ratio), dissolved in 12 ml. acid-washed dry benzene, containing 1.0 microliter of 2-pentene was treated by 0.5 ml. of 0.05 molar solution of equal molar amounts of $WCl_6$ and $C_2 \cdot H_5OH$, followed by 0.3 ml. of 0.2 molar solution of $C_2H_5AlCl_2$. An increase in viscosity was noted immediately. After polymerization at room temperature for 30 minutes the reaction was terminated by excess methanol treatment. A conversion of 76 percent to a solid elastomer was obtained. The polymer had a chlorine content of 38.7 percent (theoretical:36.7 percent), and an inherent viscosity of 0.96 dl./g.

EXAMPLE 8

The monomer described in Example 2, a product of the Diels-Alder reaction of hexachlorocyclopentadiene and 1,5-cyclooctadiene, was dissolved in benzene (4.3 gms. in 40 ml.) and 11.0 gms. cyclooctene added (1:9 molar ratio of comonomers). The copolymerization was conducted in the presence of 6.0 microliters of pentene-2, using 1.0 ml. of 0.05 molar $WCl_6$/$C_2H_5OH$ (1/1 molar ratio) solution followed by 1.0 ml. of 0.2 molar $C_2H_5AlCl_2$ solution. After one hour at room temperature, the reaction was terminated by treatment with excess methanol. A conversion of 57 percent to a solid rubber having a glass transition temperature of −68° C. was obtained. Chlorine analysis indicated that this polymer contained 10.4 percent chlorine.

EXAMPLE 9

Aldrin (3.7 gms.) and cyclooctene (9.9 gms.) were copolymerized in the presence of 4.0 microliters pentene-2, by a catalyst combination comprising 0.65 ml. of 0.05 molar solution of $WCl_6$ and 0.65 ml. of 0.2 molar solution of $C_2H_5AlCl_2$ (Al/W=4.0/1.0). The polymerization was conducted for one hour at room temperature. A conversion of 63 percent to a solid elastomer was obtained.

EXAMPLE 10

A mixture of 5 gms. aldrin and 3 gms. cyclooctene was treated by 0.8 ml. of a 0.05 molar solution of WCl₆ followed by 1.6 ml. of a 0.1 molar suspension of AlCl₃ (Al/W=4.0/1.0). The polymerization proceeded at room temperature for a period of 40 hours. After termination and drying a yield of 35 percent solid rubber was obtained.

EXAMPLE 11

A mixture of aldrin (6.0 gms.) and cyclooctene (3.5 gms.) was treated by a catalyst comprising 0.8 ml. solution of 0.05 molar WCl₆, followed by 1.6 ml. of 0.1 molar butyl lithium and 1.6 ml. of 0.1 molar AlCl₃ suspension. The reaction proceeded at room temperature for 40 hours before terminated with methanol. A yield of 11.5 percent of an elastomeric material was obtained.

While certain representative embodiments and details have been shown for the purpose of illustrating the invention, it will be apparent to those skilled in this art that various changes and modifications may be made therein without departing from the spirit or scope of the invention.

What is claimed is:

1. As a composition of matter copolymers containing the repeating unit

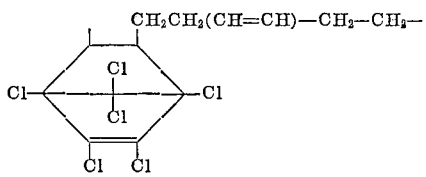

obtained by the ring opening polymerization method of a compound of the formula:

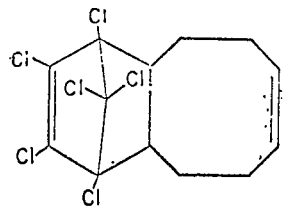

with at least one alicyclic unsaturated monomer selected from the group consisting of:

(A) alicyclic compounds corresponding to the formula (V):

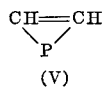

(V)

wherein:
(1) Q is a fragment which comprises a sequence of at least five carbon atoms situated in a linear succession between the methylidene carbons which constitute the double bond;
(2) the carbon atoms in the linear succession of Q may be interconnected by both carbon-carbon single bonds and carbon-carbon double bonds;
(3) any of the carbon atoms in the linear succession of Q may be substituted by at least one member from the group of alkyl, aryl, alkenyl, aralkyl, alkaryl, cycloalkyl, cycloalkenyl, bicycloalkyl, bicycloalkenyl and chlorine radicals;
(4) any of said carbon atoms in the linear succession of Q may be constituents of aromatic and alicyclic rings; and
(5) said alicyclic unsaturated hydrocarbon contains no non-aromatic conjugated double bonds; and (B) alicyclic compounds corresponding to the formula (VI):

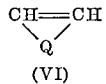

(VI)

wherein:
(1) P is a fragment which comprises a sequence of at least two and not more than three carbon atoms situated in a linear succession between the methylidene carbons which constitute the double bond;
(2) the carbon atoms in the linear succession of P are connected by carbon-carbon single bonds;
(3) any of the carbons in the linear succession of P may be substituted by at least one substituent member from the group of alkyl, aryl, alkenyl, aralkyl, alkaryl, cycloalkyl, cycloalkenyl, bicycloalkyl, bicycloalkenyl and chlorine radicals;
(4) any of said carbons in the linear succession of P may be constituents of aromatic or alicyclic rings; and
(5) said alicyclic unsaturated hydrocarbon compound contains no non-aromatic conjugated double bonds.

2. As a composition of matter copolymers containing the repeating unit

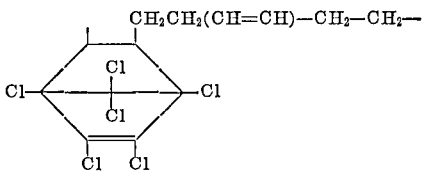

obtained by the ring-opening polymerization method of a compound of the formula:

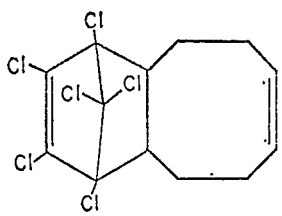

with at least one cyclic olefin selected from the group consisting of cyclopentene, cyclooctene, cyclododecene and 1,5-cyclooctadiene.

References Cited

Michelotti, F. W. and Carter, J. H., Polymerization of Norbornene and Derivatives. (II) Selectivity in Polymerization of Exo Isomers B Iridium Catalysis, in Am. Chem. Soc., Div. Polymer Chem., Preprints 6(1) 224–33 (1965).

Natta, G., et al., Stereospecific Ring Cleavage Homopolymerization of Cycloolefins etc., in Die Makromolekulare Chemie 91(1966) p. 87.

JOSEPH L. SCHOFER, Primary Examiner

J. A. DONAHUE, Assistant Examiner

U.S. Cl. X.R.

260—91.5